United States Patent

[11] 3,620,863

| [72] | Inventor | Heinz Sullhofer<br>Niederrheinstrasse 158, 4 Dusseldorf, Germany |
|---|---|---|
| [21] | Appl. No. | 767,645 |
| [22] | Filed | Oct. 15, 1968 |
| [45] | Patented | Nov. 16, 1971 |
| [32] | Priority | Oct. 16, 1967 |
| [33] | | Germany |
| [31] | | S 112413 |

[54] METHOD OF PRODUCING IN A CONTINUOUS PROCESS PLATES OF POLYURETHANE HARD FOAM WITH COVERING PLATES
4 Claims, 14 Drawing Figs.

[52] U.S. Cl. ................................................. 156/79,
156/204, 156/250, 156/267, 156/309
[51] Int. Cl. .................................................... B32b 5/18
[50] Field of Search ........................................... 156/78, 79,
204, 250, 267, 306, 309

[56] References Cited
UNITED STATES PATENTS
2,956,310  10/1960  Roop et al. ................... 156/79 UX
2,962,407  11/1960  Aykanian ...................... 156/78 X Primary Examiner—Carl D. Quarforth
Assistant Examiner—Stephen J. Lechert, Jr.
Attorney—Walter Becker ABSTRACT: Production in a continuous process of laminated plates with a core of polyurethane hard foam, according to which the reaction components to produce the polyurethane hard foam core are fed between two vertically spaced cover plates while the cover plates are advanced at a speed in conformity with the reaction speed of the components and while simultaneously with the advancement of said cover plates lateral strips are fed along the lateral longitudinal planes which define approximately the width of the laminated plates to be produced. At least one of the upper and lower marginal ends of said strips are folded outwardly away from the core being formed so as to leave at least one longitudinal gap between the lateral strips and the respective adjacent cover plate for permitting excessive foam material to escape therethrough.

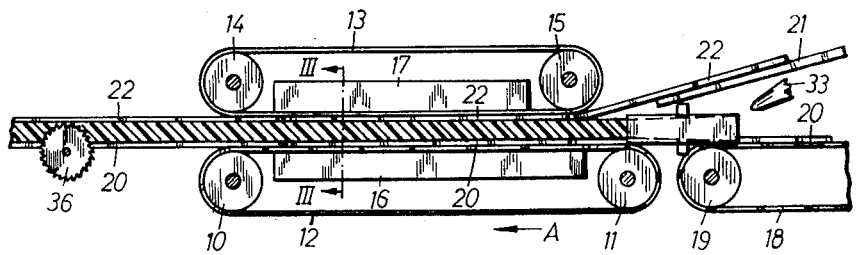
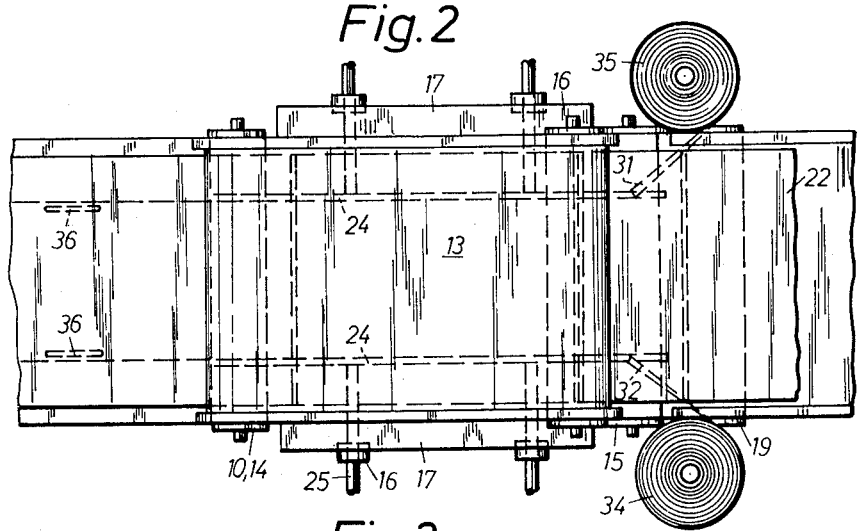
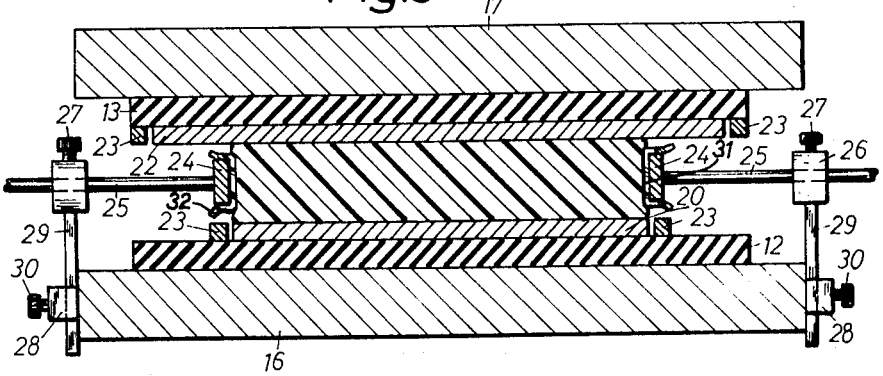

METHOD OF PRODUCING IN A CONTINUOUS PROCESS PLATES OF POLYURETHANE HARD FOAM WITH COVERING PLATES

The present invention relates to a method of and device for producing plates of polyurethane hard foam covered or laminated on both sides in a continuous process according to which the reaction components after their combination are introduced between the two covering plates—which advance at a speed corresponding to the reaction speed—and are foamed, whereupon the marginal areas of the covering material are provided with narrow strips, and both covering materials or plates are during the foaming operation laterally freely moveably guided while excessive foam material is permitted to escape freely laterally between said marginal strips and the upper cover plate. Finally, the finished web or plate is cut to length.

A method of and device for producing in a continuous manner plates of polyurethane hard foam covered on both sides with a thin flexible foil are known according to which the reaction components after their combination are applied to a foil moving at a speed corresponding to the reaction speed, and are foamed. The marginal areas of the thus covered web are trimmed, and independently of the upper wider foil which is freely movable laterally of the lower narrower foil, are prior to the application of the combined reaction components lined by a narrow marginal strip. The marginal strips are folded over and both foils are during the foaming process with the marginal strips freely movably guided while permitting excessive foam material to escape freely laterally between the marginal strips and the upper foil. By lining the marginal areas of the lower foil with the marginal strips, the lower foil is slightly lifted and in this lifted condition is by means of said foam material connected to the upper foil so that the finished plate will at its marginal areas be thinner by the thickness of the marginal strips than at the central portion. Depending on the thickness of the marginal strips, this difference in thickness is, when using and fastening the plates, disadvantageously felt to a more or less extent. By folding the marginal strips upwardly at the supports, each marginal strip forms between the lower foil and the supports a round corner which when trimming the plate edges has to be cut off whereby a considerable waste in foam material occurs. Furthermore it is not possible to produce foam plates with the lower foil laterally protruding.

It is, therefore, an object of the present invention to provide a method of and device which will make it possible to produce in a continuous manner plates which, independently of the thickness of the marginal strips, will have a uniform thickness over their entire width and according to which the covering foils or plates may selectively protrude on one or both sides at the top and/or bottom without encountering any waste of foam material.

This object and other objects and advantages of the invention will appear more clearly from the following specification in connection with the accompanying drawings, in which:

FIG. 1 diagrammatically illustrates an apparatus for carrying out the method according to the invention.

FIG. 2 is a top view of FIG. 1.

FIG. 3 represents a section taken along the line III—III of FIG. 1 but on a larger scale than the latter.

Figure 4A:
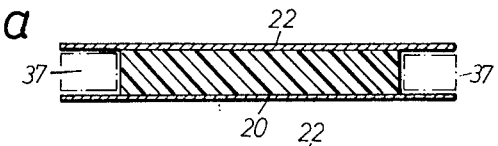
Figure 4B:
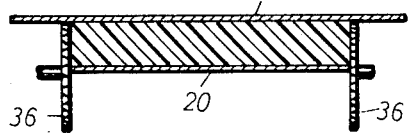

FIGS. 4a to 4l respectively illustrate different cross sections of the finished foam plate.

The method according to the present invention is characterized primarily in that the marginal strips are laterally moved toward the covering plates or foils whereupon the marginal areas of the marginal strips are laterally folded over and are guided while permitting excessive foam material to escape laterally between said marginal strips and the lower covering plate or foil. This brings about the following advantages. By the mere moving of the marginal strips from the sides to the cover plates, the lower cover plate or foil will no longer be lifted so that the finished plates will have a uniform thickness over their entire width. Since the marginal strips are folded only toward the outside no rounded corners can form between the lower cover plate and the lateral confining strips which during the trimming of the plate edges do not have to be cut off. In this way no waste of foam material occurs.

If the cover plates or foils are intended to protrude on one or both sides above and below the web of foam material, the marginal strips are introduced between the marginal areas of the cover plates or foils. Then a glued-on strip consisting of any suitable synthetic material or wood is applied in the space between the marginal areas of the cover plates adjacent the foam material core. Furthermore, there exists the possibility to permit the cover foils or plates to protrude at the marginal areas of the foam material core unilaterally or on both sides above and below the web of foam material. This results in the advantage that the covered finished foam material plates with the covering foils thereof overlap each other and may be installed and fastened and connected to each other by means of said cover foils. In such an instance only the marginal areas of the finished plate will be cut.

The device for carrying out the method according to the present invention comprises two oppositely located conveyor belts which have those sections thereof which face each other define the space in which the hard foam material is foamed. At least on one side of the web of foam material spaced from and above the lower and/or spaced from and below the lower cover plate there is provided a rail at which the marginal strips are folded. The gap formed by the spacing between the rail and the cover plates is such that foam material can escape through said gap to the outside. In this way, in a manner known per se, the cover plates are prevented from forming folds and the foam material will have a minimum specific weight.

Furthermore, it is possible to check through the upper and lower gap on both sides of the web of foam material at two locations directly after the entry of the cover foils and the foam material into the foaming space whether the plate to be formed has fully foamed at the bottom and at the top. If the plate has foamed insufficiently or excessively, it is possible immediately to adjust the quantity of foam material and the conveyor belt speed so that a minimum of waste will result.

In order to adjust the device for the production of plates of different thickness, the rails are adjustable perpendicularly with regard to the plane of the plates. For purposes of adjusting a different width of the web of foam material, the rails are adjustable, in a manner known per se, in the plane of the plates perpendicularly to the direction of movement of the web of foam material or plate to be produced. In order to permit the cover foils to adapt themselves to the path of movement of the foam material, they are laterally freely movable. To this end, the outside of the conveyor belts is provided with guiding rails for the cover foils or plates which rails are arranged with play relative to the marginal areas of the cover foils or plates.

Referring now to the drawings in detail, the arrangement shown therein comprises a machine frame not illustrated having journaled therein rollers 10 and 11 which are driven in any convenient manner at adjustable speed. These rollers 10 and 11 drive an endless conveyor belt 12. Above said conveyor belt 12 in spaced relationship thereto there is provided a conveyor belt 13 which is passed around rollers 14 and 15. Those sections of the conveyor belts 12 and 13 which face each other are supported by supporting plates 16 and 17 and define the space in which the hard foam is being foamed. The supporting plates 16, 17 are fixedly connected to the machine frame. Ahead of the conveyor belt 12 when looking in the feeding direction indicated by the arrow A, there is provided a further endless conveyor belt 18 which moves about a roller 19. This conveyor belt 18 feeds rigid plates 20 forming the lower cover plate to the conveyor belt 12 in a continuous manner. Above the conveyor belt 18 there is provided a chute 21 on which rigid plates 22 are continuously fed to the conveyor belt 13, said plates 22 forming the upper cover plates. The plates 20 and 22 may consist of metal, as for instance aluminum, but also other materials such as wood, asbestos, cement, and further suitable materials may be used for this purpose. The conveyor belts 12 and 13 are provided with guiding strips 23 between which the cover plates, 20, 21 are freely movably guided with a slight play.

The finish mixed liquid foam material is by means of a spray head 33 as uniformly as possible applied to the lower cover plate 20 where it is foamed and lifts the upper cover plate 22 against the upper conveyor belt 13. The expansion of the foam material toward the sides is limited by rails 24 which over the entire length of the supporting plate 16 and at the inner ends are connected to the inner ends of rods 25 which are displaceable in horizontal direction in clamping members 26 adapted to be arrested according to their adjustment by means of screws 27. The clamping members 26 are connected to the upper ends of rods 29 which are vertically displaceable in clamping members 28. The rods 29 are adjustable and arrestable in the clamping members 28 by means of screws 30. The clamping members 28 are connected to the lateral surfaces of the lower supporting plate 16. The foam material is so controlled that it firmly sticks to the cover plates. In order to assure that the foam material will not stick to the side rails 24, the latter are protected by narrow marginal strips 31, 32 of paper or the like which by means of the foam material are withdrawn from two supply rollers 34 and 35 arranged at the level of the entrance gap and laterally thereof. When the marginal strips 31, 32 move into the foaming space, the marginal areas of said strips 31, 32 are at the front end of the rails 24 folded laterally outwardly by escaping foam material. The quantity of the foam material, the length of the foaming distance and the speed of the circulating conveyor belts are adjusted with regard to each other in such a way that approximately one meter behind the entrance point into the foaming space the foam material will have reached the upper cover plate and will firmly stick thereto. Already at this point there exists the possibility of checking whether the plate to be produced is fully foamed at its top and bottom. Depending on where the foam material will reach the upper cover plate first, forces occur which have the tendency to displace the cover plates relative to each other which is possible due to the lateral free movability of said cover plates relative to the conveyor belts. If in spite of a new adjustment of the quantity of foam material and of the conveyor belt speed, due to unavoidable irregularities during the application of the foam material, too much foam material is introduced, the excessive foam material may escape toward the outside through the narrow gaps between the rails 24 and the cover plates 20, 22 past the marginal strips 31, 32 whereby a compacting of the foam material will be avoided and its specific weight will be kept at a minimum.

At the end of the foaming path a web of foam material of uniform height and thickness is obtained the marginal areas of which are trimmed by cutters 36 or are only chamfered. The cutters enter the web of foam material from below only up to the upper cover plate because, according to the embodiment of FIG. 4b, the upper cover plate is wider than the lower cover plate. This has the advantage that the finished foam material plate is able by means of its protruding marginal areas to overlap two other foam material plates installed adjacent thereto.

Figure 4C:
Figure 4D:
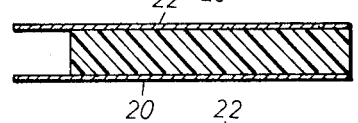
Figure 4E:
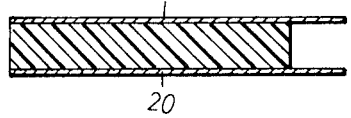
Figure 4F:
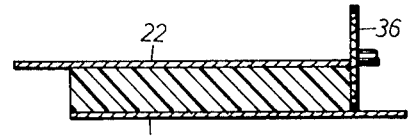
Figure 4G:
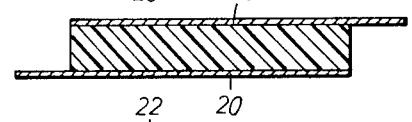
Figure 4H:
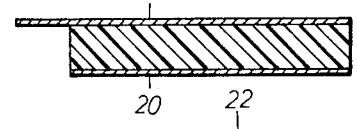
Figure 4I:
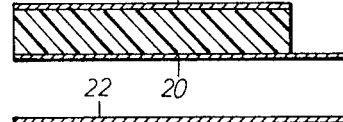
Figure 4K:
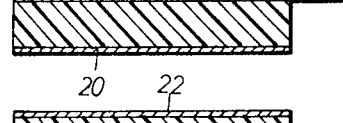
Figure 4L:
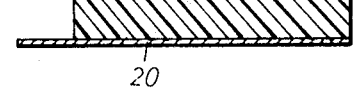

As will be evident from FIG. 4c, also the lower cover plate may be wider than the upper cover plate. In such an instance the cutters enter the finished web of foam material from above. The cover plates, however, may also protrude unilaterally on both sides at the top and/or at the bottom so as to yield webs of foam material as illustrated in FIGS. 4d to 4l. These various possibilities may be advantageous in different instances. When the cover plates protrude at the top and at the bottom on one side or on both sides, a glued-on liner or gluing-in edge means 37 is applied as indicated in dot-dash lines in FIG. 4a. When trimming or chamfering the marginal areas of the covered web of foam material, depending on whether the cover plates do not protrude or one of them protrudes, the marginal strips are cut off. Subsequently, the finished web of foam material is cut to length. When a different width of the plate is desired, the rails 24 are correspondingly moved away from or toward each other as the case may be. If a different height of the plates is desired, the supporting plates are correspondingly adjusted away from or toward each other and the rails 24 are adjusted when minor changes in the height are desired or are exchanged when major changes in the height are desired.

It is, or course, to be understood that the present invention is, by no means, limited to the particular showing in the drawings but also comprises modifications within the scope of the appended claims.

What I claim is:

1. A method of producing in a continuous process laminated plates with a core of polyurethane hard foam, which includes the steps of: feeding the reaction components to produce the polyurethane hard foam core between two vertically spaced cover plates while advancing said cover plates at a speed in conformity with the reaction speed of said components, simultaneously with the advancement of said cover plates feeding lateral strips along the lateral longitudinal planes defining approximately the width of the core to be produced while under foaming pressure marginally folding at least one of said strips outwardly away from said core being formed so as to leave at least one longitudinal gap between said lateral strips and the respective adjacent cover plate so as to permit excessive foam material to escape laterally outwardly through said gap, following solidification of said foam material trimming the sides of the thus produced laminated plate product, and cutting said plate product to plates of desired length.

2. A method according to claim 1, which includes the steps of feeding said lateral strips along edges between the marginal areas of said cover plates while the latter are being advanced.

3. A method according to claim 2, which includes the steps of applying a gluing-in edge means along the marginal areas of the cover plates adjacent the foam core.

4. A method according to claim 1, which includes the step of trimming edges of the marginal areas of the produced laminated plate product.